No. 692,228. Patented Feb. 4, 1902.
H. BENDER.
CIDER AND FRUIT PRESS.
(Application filed Apr. 17, 1901.)
(No Model.) 6 Sheets—Sheet 1.

WITNESSES:
B. F. Pettit
H. A. Hartman

Henry Bender
INVENTOR

BY
H. C. Hartman
his ATTORNEY.

No. 692,228. Patented Feb. 4, 1902.
H. BENDER.
CIDER AND FRUIT PRESS.
(Application filed Apr. 17, 1901.)
(No Model.) 6 Sheets—Sheet 2.

WITNESSES:
B. F. Pettit
H. A. Hartman

Henry Bender INVENTOR
BY
H. C. Hartman
his ATTORNEY.

No. 692,228. Patented Feb. 4, 1902.
H. BENDER.
CIDER AND FRUIT PRESS.
(Application filed Apr. 17, 1901.)

(No Model.) 6 Sheets—Sheet 3.

WITNESSES:
B. F. Pettit.
H. A. Hartman.

Henry Bender INVENTOR

BY
H. C. Hartman
his ATTORNEY.

No. 692,228. Patented Feb. 4, 1902.
H. BENDER.
CIDER AND FRUIT PRESS.
(Application filed Apr. 17, 1901.)
(No Model.) 6 Sheets—Sheet 4.

WITNESSES:
B. F. Pettit
H. A. Hartman

Henry Bender INVENTOR
BY
H. C. Hartman
his ATTORNEY.

No. 692,228. Patented Feb. 4, 1902.
H. BENDER.
CIDER AND FRUIT PRESS.
(Application filed Apr. 17, 1901.)

(No Model.) 6 Sheets—Sheet 5.

WITNESSES: Henry Bender INVENTOR

BY H. C. Hartman
his ATTORNEY.

No. 692,228. Patented Feb. 4, 1902.
H. BENDER.
CIDER AND FRUIT PRESS.
(Application filed Apr. 17, 1901.)
(No Model.) 6 Sheets—Sheet 6.

WITNESSES:
B. F. Pettit.
H. A. Hartman.

Henry Bender INVENTOR
BY
H. C. Hartman
his ATTORNEY.

UNITED STATES PATENT OFFICE.

HENRY BENDER, OF RESERVE, INDIANA.

CIDER AND FRUIT PRESS.

SPECIFICATION forming part of Letters Patent No. 692,228, dated February 4, 1902.

Application filed April 17, 1901. Serial No. 56,179. (No model.)

*To all whom it may concern:*

Be it known that I, HENRY BENDER, a citizen of the United States, residing at Reserve, in the county of Miami and State of Indiana, have invented certain new and useful Improvements in Cider and Fruit Presses; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in cider and fruit presses in which the presses and graters are operated by power and the pomace or pulp is pressed in layers; and the objects of my invention are, first, to provide means whereby the operations shall be continuous and automatic; second, to provide means whereby the bed of the press shall rest upon springs which can be regulated to resist any given pressure—say twenty tons—and so adjust the movement of the platen upon it that all pressure upon the pulp shall be resisted by the force of this spring, thereby regulating the pressure upon the pulp; third, to provide means whereby the pomace shall be carried from the grater to the press in single layers of equal widths and lengths and preferably of uniform thickness; fourth, to provide means to confine and inclose the pomace, so that it is not seen or exposed until the cheese passes from under the press and no particle or drop of pomace or liquid falls outside of the conductors, thereby avoiding all waste and possible contamination by dust or insects; fifth, to provide such press with means to act automatically to hold the ends of the layers or cheese in place while the pressure is being exerted thereon, thereby retaining such layers or cheese in place and confining it to the action of the press; sixth, to provide means to carry the cheese away from the press and drop it in position out of the way of the machine and the operator into any suitable receptacle; seventh, to provide means whereby the cider-cloth forming the endless belt shall be continually kept clean and free from clogging up, and, eighth, to provide a machine whereby all of the different operations described and the manufacture of cider from the time of the delivery of the apples into the hopper until the cheese shall be thrown off of the machine and the cider run off into barrels shall be continuous and automatic, the power being applied to one pulley and from thence by intervening mechanism to the various parts of the machine, so as to operate them in the manner stated. I attain these objects by the mechanism illustrated in the accompanying drawings, in which—

Figures 1, 18:
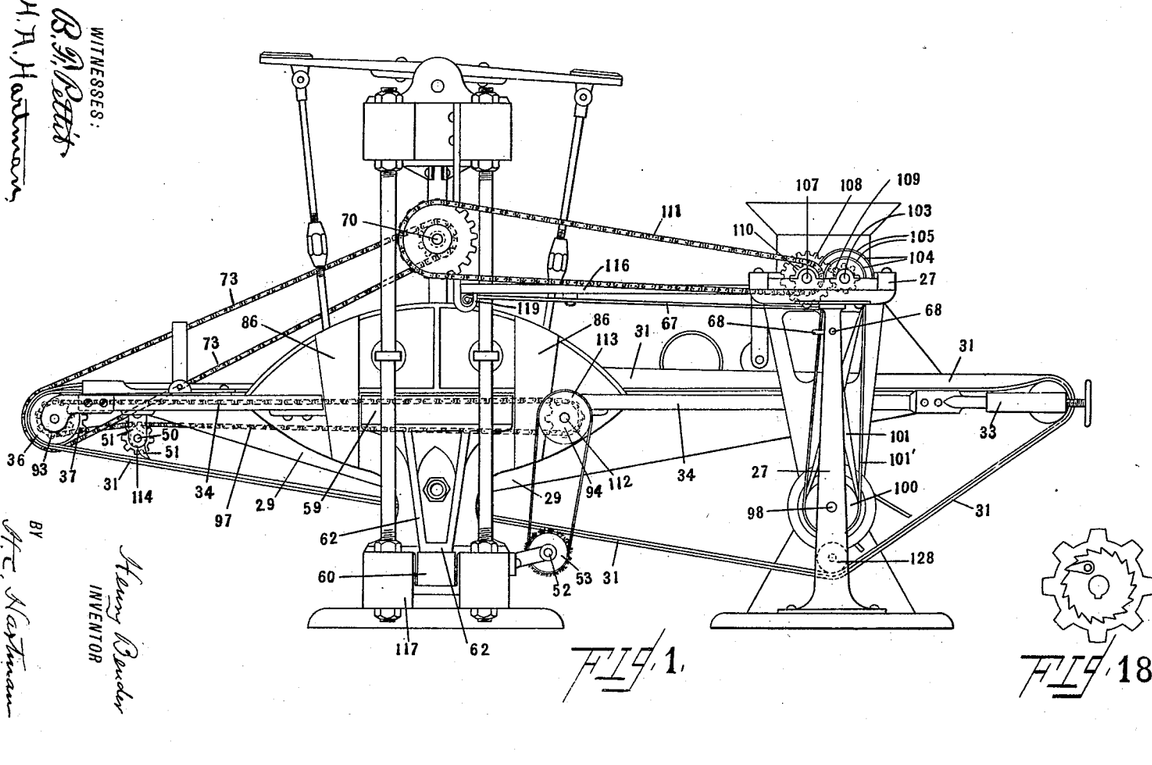
Figure 1 is a side elevation of the entire machine.
Fig. 18 is a detail of ratchet-gear for front roller.
Figure 2:
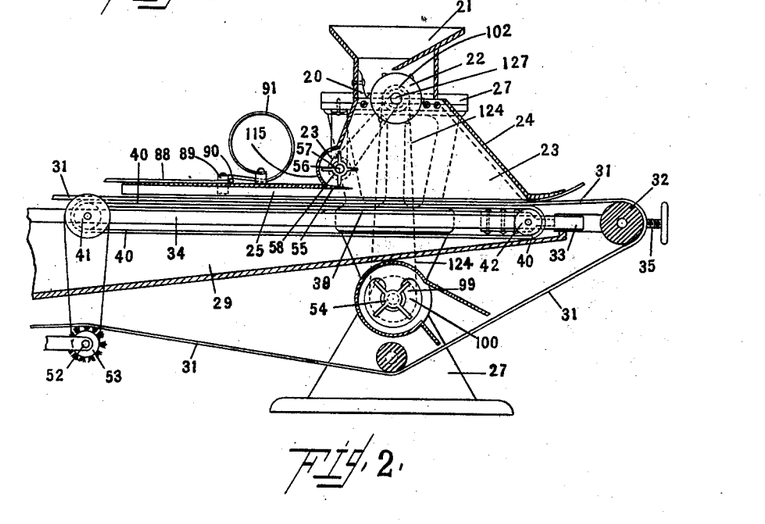
Fig. 2 is a cross-section of the fruit-grinder, layer-former, layer-chute, spring-clamp for top cloth, blower, and belt-tightening device.
Figure 3:
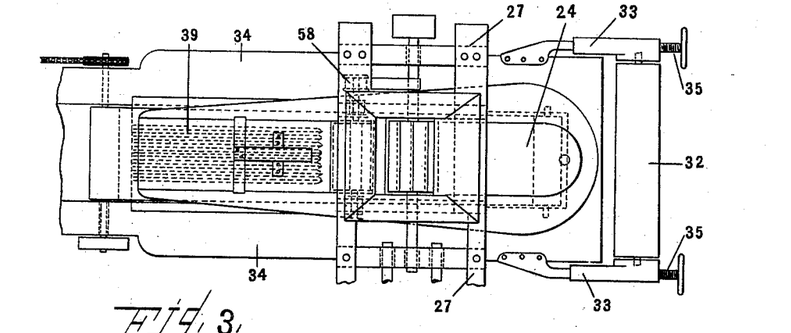
Fig. 3 is a plan view of Fig. 2, showing also the corrugated-iron supporting-plate.
Figure 4:
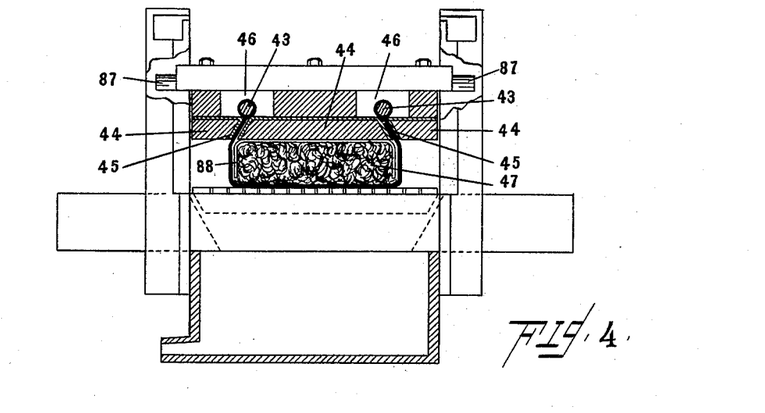
Fig. 4 is a cross-section of the press with platen in raised position and the fruit layer in position.
Figure 5:
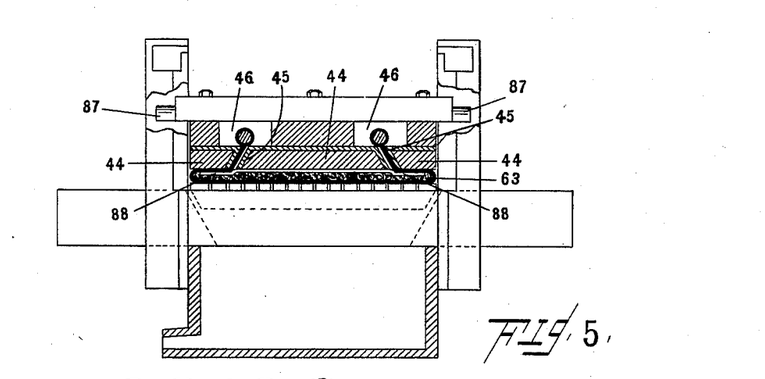
Fig. 5 is a cross-section of the press with the platen down upon the fruit layer.
Figure 6:
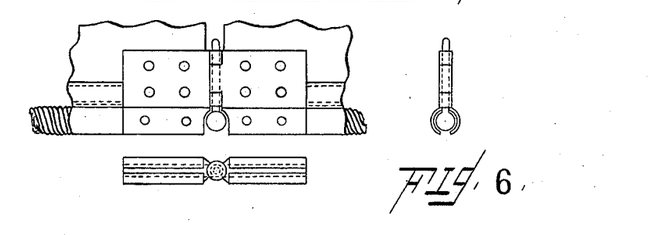
Fig. 6 is three details of hinge for holding the ends of the cider-cloth belt.
Figure 7:
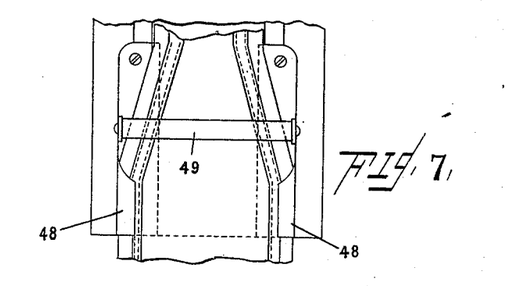
Fig. 7 is a plan view of the cider-cloth-belt spreader.
Figure 8:
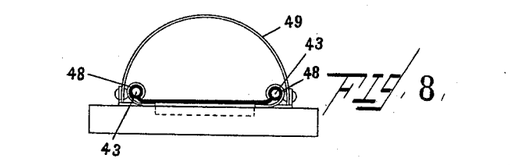
Fig. 8 is a cross-section of Fig. 7.
Figure 9:
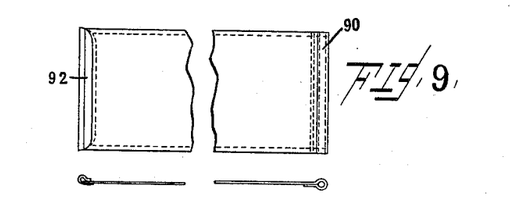
Fig. 9 is a view of top cloth and attachments for ends of same.
Figure 10:
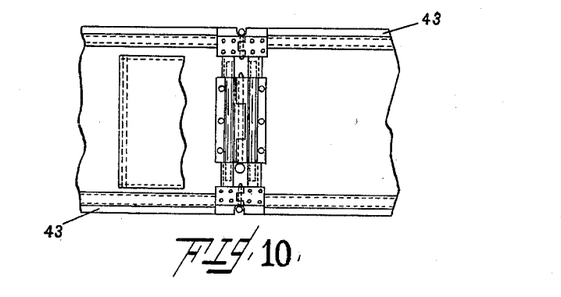
Fig. 10 is a view showing the method of fastening the ends of the cider-cloth belt.
Figure 11:
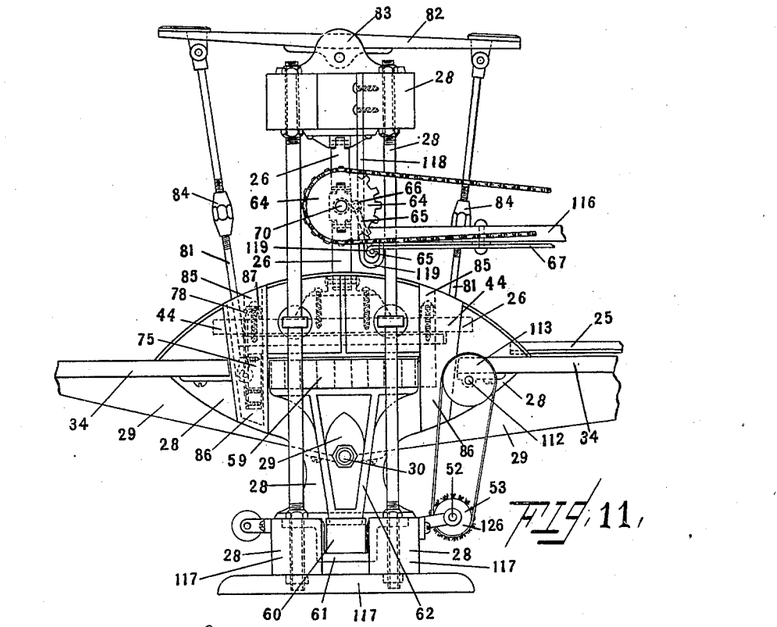
Fig. 11 is a side elevation of the press and frame in detail.

In the construction of my improved cider and fruit press I utilize the ordinary grater or grinder common in the market and any suitable press, either toggle-joint, screw, or hydraulic, whichever may be desired and which is or can be adapted to be operated by power. The only change I make in the grater 20 is in the hopper 21. I extend one side of the hopper 21 beyond the center line of the cylinder 22, which carries the cutting or grinding knives, so that the apples or fruit are delivered to the cutters on their downward motion, whereby the apples or fruit are drawn into the grater 20 and they are thus prevented from striking any of the upwardly-moving knives or cutters, which tend to throw them out of the hopper, thereby avoiding the necessity of paying any attention to the hopper-feed. Below the hopper 21 and in communication with it I provide and place a receiver and former 23 for the pulp or ground fruit. It is constructed of any suitable material, preferably of galvanized iron, and is provided with a closed door 24 at its rear end for cleansing and at its forward end with a chute 25, communicating with it and extending to or near to the press 26. The bottoms of this receiver and chute are open. Inside of the receiver 23 and at the point where the pulp passes into the chute a knife 55 is placed transversely, adapted to cut the pulp at the desired height of the fruit layer as it passes into the chute 25. To prevent clogging, there is also placed just back of the knife-edge and within a semicylindrical extension 115 of the receiver 23 a revolving roller 56, provided with angling blades 57, adapted to throw back into the receiver any surplus pulp which passes forward over the knife, the angling position of the blades 57 being adapted to throw such pulp not only backward, but sidewise, to "spread" it, so to speak. This roller 56 is operated by a pulley 58 on the outside. The vertical thickness of the chute 25 corresponds to the desired thickness of the fruit layer to be passed into the press. The transverse length or width of both chute and receiver are the width of the fruit layer. A rear frame 27 supports the grater 20 and its hopper 21 and other mechanism hereinafter described. There is also a press-supporting frame 28 placed forward of the rear frame 27, which supports the press 26 and the mechanism operated in conjunction therewith. Upon these two frames, beneath the press 26 and beneath the receiver 23, is provided and placed a tank 29, secured to and supported by a tank-frame 34. The bottom of the tank is inclined from the ends of its frame in both directions to a central point under the press 26, from which lowest point of the tank the juice is discharged through an orifice 30, to which may be attached any suitable conductor (not shown) to lead the discharged juice to any desired receptacle. This tank-frame 34 is provided at both ends with arms, upon which are mounted rollers of sufficient diameter to hold an endless belt 31 clear of its ends. The ends of the endless belt 31 are preferably joined by disconnectible hinges, as shown in Fig. 10. At the rear end of the tank-frame 34, which is the one nearest the hopper 21, the rear roller 32 is mounted on sliding boxes 33, attached to each side of the arms of the tank-frame 34 and operated by screws 35 to adjust the tension of the endless belt 31. The front roller 36 is provided on one end with a sprocket-wheel 37, by which it is revolved. I have illustrated a knuckle-joint press 26 and shown mechanism attached whereby the belts are shifted, as hereinafter described. The receiver 23 and chute 25 have a plate placed beneath them, resting on the tank-frame 34, preferably in two sections, one formed with a smooth surface on one end and at its other end with a corrugated surface, one of them, a smooth plate 38, placed directly underneath the receiver and the other, a corrugated plate 39, extending from the receiver to or near to the press 26. These plates rest on the edges of the tank-frame 34 and are intended to give additional support to the pulp or fruit layers 47 upon the endless belt 31, which moves over them. Over these plates an auxiliary endless belt 40 runs over rollers, one, 41, near the press and the other, 42, at the rear end of smooth plate, the roller 41 being operated by the propelling mechanism, as hereinafter described. The object and purpose of this auxiliary endless belt 40 are to assist in carrying the fruit layers 47 to the press, and it is preferably made of heavy sail-cloth. The endless belt 31, which extends around the tank and tank-frame longitudinally, is made of cider-cloth or other suitable material. Its edges are bound on each side to strong cords 43, preferably by passing the edges around the cords and sewing them, and, if desired, they may be reinforced by narrow strips of cloth. Where the endless belt 31 passes underneath the press 26, the platen 44 of the press is constructed to have narrow angling slits 45 longitudinally through it and a space 46 above the slits 45 of sufficient capacity to permit the cords 43 to pass freely through them, whereby the cords or corded edges travel through the platen 44 and over its impinging surface, and thereby the corded edges of the endless belt 31 are held up and contract the belt in cross section, so that it assumes longitudinally the form of the fruit layer 47, as shown in Fig 4. The endless belt 31 passes over the rollers 36, thence down underneath the tank 29, to and over the rear roller 32, and back again. The cords 43 on the sides of the endless belt pass through loops or guides 48, placed near the front roller 36, and are kept spread apart by a spring 49, so that the endless belt will be stretched out its full width as it passes over the roller 36. (See Figs. 7 and 8.) Just after the endless belt 31 passes the front roller 36 and under the forward end of the tank 29 there is a beater provided, adapted to strike the endless belt 31 with short poundings to shatter off the debris or fruit remaining attached. It consists, preferably, of a shaft 50, provided with arms 51, as shown in Fig. 1, so that as the shaft revolves these arms 51 are revolved and strike the endless belt 31 its entire width. When the endless belt 31 passes on farther, preferably at the rear of the press-frame, a revolving brush-shaft 52, provided with brushes 53, is arranged to revolve against the endless belt in an opposite direction to its movement, whereby the endless belt is further cleansed by the brushing off of any remaining debris or pulp. At another place, preferably on the rear frame 27, a blower 54 is attached to force air down upon the belt 31, and thereby open any interstices therein which may have become clogged and not removed by previous cleanings. The endless belt 31 then passes on up over the rear roller 32, thence under the receiver 23 and the chute 25, and over, upon, and with the auxiliary belt 40, carrying with it a layer of pulp or pomace to and under the press, at which point the motion of the belt 31 is stopped until the press has acted upon the fruit layer 47, as hereinafter described.
The press-supporting frame 28 supports the press and other devices hereinafter described. I have illustrated a toggle-press 26, in which two toggles are pivoted to a cross-head at their lower extremities, and an operating-shaft 70, provided with two oppositely-threaded screws, are operated by a sprocket-wheel 64, mounted on the shaft 70, causing them to approach or recede from each other, whereby the follower or platen 44 is raised or lowered.
Such presses are in common use, and I do not claim anything as to such construction. I have preferred to show this form of press, because it will more clearly illustrate the means of operating the shifting devices which I employ, as hereinafter described. The only changes I make in the press itself is that I construct or provide the platen 44 thereof or a special platen to be attached to it with tubes or spaces 46 on each side thereof passing longitudinally through it at a short distance above its bottom surface. These spaces 46 are of sufficient size to permit the cords 43 of the endless belt 31 to pass freely through them, and it is so constructed as to avoid as little frictional contact as possible. From these spaces 46 angling slits 45 extend to and through the bottom of the platen, as shown in Fig. 4. These angling slits 45 are also constructed so as to have as little frictional surfaces as possible, to permit the sides of the endless belt 31 to pass freely through them. The purpose of this construction is to contract the endless belt, so that when it passes underneath the platen 44 it shall assume the form shown in Fig. 4, whereby the fruit layer 47 is held longitudinally in place by the endless belt 31, and it also permits and controls the expansion of the endless belt 31 when the platen moves down upon the fruit layer 47, as shown in Fig. 5, in which a cheese 63, formed by the action of the press, is shown. The bed-plate 59 of the press is also changed in two particulars. First it is provided with slits, through which the juice passes into the tank below it. This is common in cider-presses; but the other particular construction which I claim as new is that by which I support the bed-plate 59 of the press upon the frame 62, resting upon springs.
I illustrate in the drawings, Fig. 11, a piece of timber adapted to support the press-frame 28 with more or less resiliency, according to the force exerted by the press, and to move accordingly. It is placed between the bottom supports 117 of the press-supporting frame 28 and is held centrally in a stirrup 61, so that its ends move up and down with the resiliency of the timber 60. Upon the ends of this timber 60 the vertical frames 62, supporting the bed-plate 59, are attached to it, so that when pressure is exerted upon the bed-plate sufficiently to overcome the resiliency of the timber 60 it will bend the spring down, and thereby permit the bed-plate to be lowered from its usual position a given distance equal to a certain portion, about one-fourth, of the thickness of the cheese 63. I adjust such pressure, preferably, at twenty tons; but it may be greater or less, as may be desired. Other forms of springs may be used for the same purpose. I do not, therefore, confine myself to a piece or stick of timber for a spring. It is obvious that anybody skilled in the art could construct a number of various kinds of springs which would afford like resistance to the descent of the bed-plate 59.

To some part of the moving parts of the press 26 which operate the platen 44 I attach mechanism to automatically shift the belts on the driving-pulley operating the press from tight to loose pulleys, and vice versa, so that the sprocket-wheel 64 shall revolve first in a forward direction and then in a reverse direction, whereby the platen is alternately lowered and raised. Such mechanism consists in providing a projection 66 on the right-hand toggle, through which a shifting-rod 65 passes freely; placing a ridge-pole 116 with one end on a stirrup 118, suspended from the top part of the press-supporting frame 28 and attaching its other end to the top of the rear frame 27; attaching to one side of the ridge-pole near the stirrup a lug 119, through which the other end of the shifting-rod 65 passes; placing, preferably, underneath the ridge-pole a shifting-lever 67, pivoted thereto, the pivot forming the fulcrum of the lever; attaching pivotally the forward end of the lever to the lower end of the shifting-rod 65, and providing shifters 68 at the other end to engage the driving-belts, which pass over the main driving-pulley 100 to the tight pulleys 104 and to the loose pulleys 105 above it when shifted, as hereinafter described. Two collars are adjustably secured on this shifting-rod 65, one between its points of support and the other on the farther side of the projection 66, which projection moves forward and backward on the shifting-rod with the movement of the toggle. When the toggle moves outward, raising the platen 44 to about an inch below its highest elevation, the outer collar 120 is so adjusted that the projection 66 then strikes it, moving the shifting-rod 65 outward, and thereby operating the shifting-lever 67. When the toggle moves inward, causing the platen 44 to move downward, the inner collar 121 is then adjusted so that the projection 66 shall strike it and operate the shifting-lever 67 just as the platen reaches its lowest point of movement, thereby reversing the motion of the shaft 70.

Figure 12:
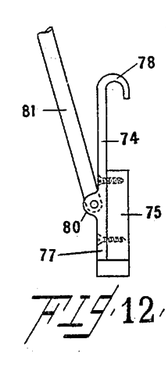
Fig. 12 is a detail showing the construction of the front stopping-plate.
Figures 13, 14:
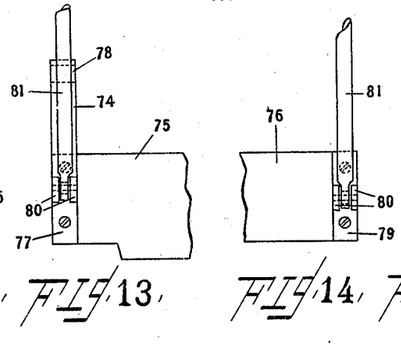
Fig. 13 is a side view of Fig. 12.
Fig. 14 is a detail of the rear stopping-plate.
Figure 15:
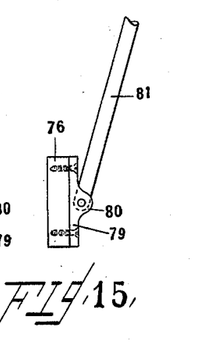
Fig. 15 is an end view of Fig. 14.
Figure 16:
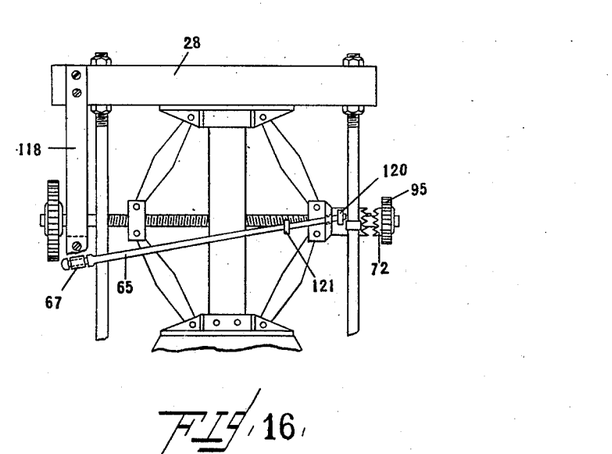
Fig. 16 is an end elevation of part of toggle-press.
Figure 17:
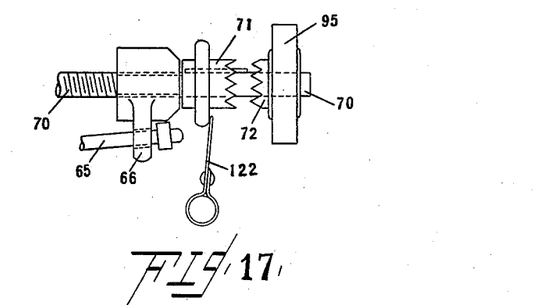
Fig. 17 is a detail of the clutch-coupling on end of toggle-shaft.

Another shifting device is provided to operate the loose sprocket-wheel 95 on the right hand of the toggle-shaft 70, which is provided with a clutch 72. A sliding clutch 71 is mounted on the shaft 70 near to the sprocket-wheel 95 and held out of engagement by a spring 122. As the toggle moves outward it impinges against the sliding clutch-wheel 71, engaging the clutch 72, whereby the sprocket-wheel 95 is revolved. As the toggle moves inward the spring 122 resumes its action and forces the clutch-wheel 71 out of engagement. The sprocket-wheel 95 communicates motion to the sprocket-wheel 37 on the front roller 36 by means of a sprocket-chain 73. The sprocket-wheel 37 is loosely mounted on the front roller 36 or on its shaft. On the same roller or shaft just outside of the sprocket-wheel and holding it in place a ratchet-wheel to operate the shaft or roller 36 is securely mounted, and a pawl on the sprocket-wheel is so adjusted that it will operate only to move the ratchet-wheel in a forward direction, a construction well known. This provides means whereby the movements of the press and of the endless belt are so regulated automatically that when the platen is raised from the bed of the press a sufficient distance the endless belt commences to revolve, carrying the cheese out and over the front roller 36 and at the same time carrying a new fruit layer 47 into and under the press 26, by which time the shifting devices again operate, the motion of the endless belt is stopped, and the platen of the press begins to descend, as described. It will be seen that the transverse section or width of the fruit layer is regulated by the chute and by the construction of the platen, whereby the sides of the endless belt are held up. To hold the ends of the pulp in place while being pressed, means are provided whereby stopping-plates are adjusted to close the ends of the press and move down with it while the press is acting upon the layer. This is an entirely new idea and a new construction. I prefer as means therefor the construction shown in the drawings, which consists of the two stopping-plates, one placed at each end longitudinally of the press and under the ends of the platen 44. The forward one 75 is provided with a metal sheet or facing 77, with arms 74 extending above it on each side of the platen 44 and bent to form hooks 78, as shown in Figs. 12 and 13. The rear stopping-plate 76 is provided with a metal facing 79, but it does not extend above the plate. About the center of these metal facings on each end projections or ears 80 are provided, to which the supporting-rods 81 are pivoted, two to each stopping-plate and on each end of the plates, respectively. The upper ends of these supporting-bars are attached to spring-beams 82, which are centrally and pivotally attached to studs 83 on the upper end of the frame. These supporting-rods 81 are made adjustable by being made in two pieces and connected by turnbuckles 84 to carefully adjust their lengths. When the press 26 is open for the entrance of the fruit layer 47, the rear plate 76 is forced down, so that its upper edge is below or even with the surface of the bed-plate 59, while the forward plate 75 is held near the platen of the press, and the lengths of the plates are such as to extend entirely across the platen 44 of the press and into slots 85, formed in the sides of the frame 28, whereby the stopping-plates are held against any longitudinal movement or pressure and have a free vertical movement in the slots. These slots 85 are provided with vertically-placed boxes 86, attached to the outside of the frame 28, having open ends and adapted to prevent the escape of the juices laterally and also to provide space for the movement of the rods therein. Projections 87 are attached to the top of the platen 44, on both sides thereof, so that when the platen rises these projections engage the hooks 78, attached to the front plate 75, from the time of such engagement, thereby raising the front plate with it. The adjustment is such that when so engaged the top of the plate 75 is just a sufficient distance below the platen 44 to permit the cheese to move freely out of the press over it. When these projections 87 engage the hooks 78, the further upward movement of the platen 44 lifts or raises the hooks 78 with it, and by means of their connection with the plate 75 said plate is thereby also raised. The supporting-rods 81, attached to the plate 75, are also thereby elevated, elevating the ends of the spring-beams 82 until they tilt the rearward ends of the spring-beams 82 down sufficiently to push the rear plate 76, by means of its supporting-rods 81, down until its top edge is on a level or just below the level of the bed-plate 59, thus again opening that end of the press for the admission of another fruit layer. There is another important function of this construction. When the cheese 63 is formed by the full pressure of the press, it is of a fine hard substance, board-like in form, and the pressure has impacted the cheese to some extent against the bed-plates, so that it requires considerable force to remove it when longitudinally applied. The raising of the front plate 75, as described, raises also the endless belt 31 and the cheese 63 up from the bed-plate 59, so that all the impact remaining is on the rear edge of the cheese 63, thereby loosening it for easy removal by the belt 31, and the cheese is then easily drawn up over the stopping-plate 75 and out of the press.

When the press is open for the reception of a fruit layer, the front plate 75 extends above the level of the bed-plate 59 some distance and within a short distance from the platen 44, as hereinbefore described; but it is sufficiently above the bed-plate 59 to form a stopping-plate for the fruit layer and prevent any portion of it from passing over it. This prevention is also aided by the endless belt and a cover-cloth 88, lying over the fruit layer 47, which is hereinafter described, and passing up over the edge of this forward plate, thereby being held up and forming an additional stoppage. As the platen 44 moves down, the front plate 75 remains stationary until the platen strikes it, the distance being so short that the fruit layer 47 is not disturbed. Then as the platen moves still farther downward it carries with it the front plate 75, and thereby pulls down the front ends of the beams 82. This action raises the rear plate 76 and it soon impinges against the platen 44. As the platen moves farther down upon the fruit layer it carries with it both plates impinging against it and held firmly in such impingement by the action of the spring-beams, which then act as a spring, increasing the force of the impingement as the platen 44 moves downward. These stopping-plates being by construction underneath the endless belt and the cover-cloth 88 carry them with them into impingement against the platen 44, whereby the fruit layer 47 is entirely inclosed by them.

The cover-cloth 88 is a cloth adapted in width to extend over the chute 25 and down the sides thereof until its edges reach the endless belt 31. One end of it is placed over the chute 25 and down its sides to an impingement against the belt 31. It is then secured to the chute 25 by a clamp 89, extending over the top and the side of the chute 25. On the rear of this clamp 89 the cover-cloth 88 is provided with a corded end 90, whereby when the clamp 89 is in place it is held in rear of said clamp and cannot pass it. The clamp 89 is held in place by a spring 91 or other construction attached to the chute 25 and adapted to hold it firmly upon the chute 25, so that when the cover-cloth 88 is drawn forward the corded end 90 of the cover-cloth impinges against the clamp, and the cloth 88 is thereby held from passing under it. The cover-cloth 88 extends through the press 26 and a short distance beyond it, and its forward end is provided with a spreading-piece 92 across its entire width, which consists, preferably, of a flat metal binding with rounded ends adjusted to lie against the edges of the endless belt 31 and to be held in place thereby. It will be seen that as the fruit layer 47 passes from the chute 25 to the press 26 it is covered on the top and sides by this cover-cloth 88, and at the same time as it passes into the press the sides of the endless belt 31 are raised by means of the corded edges 43, as hereinbefore described, so that the fruit layer 47 is completely surrounded longitudinally by the belt 31 and cloth 88, as shown in Fig. 4.

The mode of operation is as follows: The power is applied to the main shaft which is journaled in the rear frame. The wide pulley 100 on the main shaft 98 is revolved by it and operates two belts. The cross-belt 101 passes up and over a tight pulley 105, mounted on a transverse shaft 103, journaled in the upper part of the rear frame 27, and it is shifted onto a loose pulley 104 of the same diameter, mounted on the same shaft alongside of it. When the shaft 103 is operated by the cross-belt, it moves forwardly and by connections hereinafter described causes the press-platen to move downward. The other or straight belt 101' passes up over a smaller pulley 105, mounted on the same shaft 103 and provided also with a loose pulley 105' alongside of it. When this pulley 104' operates the shaft, the toggle-shaft 70 is operated to raise the platen. Parallel to this transverse shaft 103 is another shaft 107, mounted near to it, provided with a cog-wheel 108 and a small sprocket-wheel 110. The cog-wheel meshes with a pinion 109, mounted on the shaft 103, whereby motion is communicated. These two belts are shifted at the same time by the shifter and devices hereinbefore described, so that when one belt is on a loose pulley the other belt is on a tight pulley, and vice versa. From the small sprocket-wheel 110 on the parallel shaft 107 a sprocket-chain 111 passes to the sprocket-wheel 64 on the toggle-shaft, thereby operating the toggle backward and forward as the shifting devices automatically give a forward and reverse motion. On the other end of the toggle-shaft 70 is a sprocket clutch-wheel operated by a sliding clutch, as hereinbefore described. From this sprocket clutch-wheel a sprocket-chain 73 extends to and operates the sprocket-wheel 37 on the front roller and shaft to operate the front roller, as hereinbefore described. The front roller 36 by the constructions described is moved only forwardly and will not move until the sliding clutch engages the small sprocket-wheel 95 on the toggle-shaft and will move then only when the shaft is having a forward movement, any slight rearward movement being provided against by the ratchet mechanism described. From an inner-placed sprocket-wheel 93 on the front roller a sprocket-chain 97 extends rearwardly to a sprocket-wheel 94 on the auxiliary-belt roller, which is constructed exactly the same size, so that the motion of the auxiliary belt shall coincide with the motion of the endless belt. As this sprocket-chain 97 passes underneath the tank-frame it is raised up by and passes over a small sprocket-wheel 114, attached to the beater-shaft, whereby the beater is operated when the endless belt is moving and at no other time. On the other end of the auxiliary-belt shaft 112 outside of the tank-frame a pulley 113 is attached, from which a belt passes down and over a pulley 126 on the brush-shaft 52, operating it only while the endless belt is in motion. As the main shaft passes through the rear frame it passes through a blower 54, mounted upon it, and which is operated by it to blow air down upon the endless belt. This blower 54 by construction is therefore operated continuously. On the projecting end of the main shaft a pulley 99 is mounted, from which a belt 124 extends upward to and over a pulley 102, operating the grater-shaft, and this motion is continuous without interruption. From a small pulley 127 on the grater-shaft another belt extends down to and over a pulley 58 on the shaft operating the spreading-roller 56 in the receiver, and this motion is also continuous. The motions of the platen up and down and of the shifting devices have been hereinbefore described, also the movement of the endless belt carrying the fruit layers underneath the press in succession. It will thus be seen that the operation is continuous, some portion of the mechanism being operated all the time and other portions intermittently to permit time for the press to act, as hereinbefore described.

In the machine I have described, which is a medium-size machine, the fruit layers contain about six bushels of grated apples or other fruit, and the adjustments of the pulleys and sprocket-wheels are such that the platen operates to press one such layer every three minutes, and such layer is delivered to the press every three minutes, and the formed cheeses are removed out over the end of the front roller one every three minutes and dropped into any receptacle that may be placed for them. It will be seen that a press of this size will therefore consume one hundred and twenty bushels of apples every hour, or twelve hundred bushels in a day of ten hours, and that there is no manual labor required except to feed the hopper, to attend the engine, and watch the machinery to see that it runs smoothly without obstructions. For this purpose two men are sufficient. In fact, two men could attend three machines, which is a great reduction of labor over the best machines for making cider now in use, which for the output stated would require not less than six men for twelve hundred bushels per day, whereas by the use of three machines thirty-six hundred bushels are converted into cider with the labor of only two men. Another advantage is that there is not a particle of cider or juice wasted. There is no possibility of any of it being scattered over the machinery or on the floor, and the entire operation is cleanly. I have illustrated and shown a machine which is a new advance in the state of the art in several important respects. First, it provides for continuous automatic operation; second, it provides a yielding bed-plate adjustable to any pressure, whereby whatever may be the thickness of the fruit layer it always receives the same pressure; third, it provides means for forming a fruit layer and inclosing it in cider-cloth in such a manner as to provide for its complete pressure automatically, and, fourth, I have provided means whereby cars, tracks, and racks heretofore in use to convey the fruit layers to and under the press are entirely dispensed with, and such layers are formed and carried into position automatically without any manual labor whatever. I have also provided new means for cleaning the cider-cloth, consisting of a beater, a brush, and a blower, operated as described, so that the cider-cloth can be operated all day without removal or renewal. In addition to this, for further cleaning all that is necessary is to apply a spray of water upon the cloth while it is in motion at a point just before it passes under the blower, which is its lowest point and where it is held down under the blower by a transverse roller mounted in the rear frame, thereby dispensing entirely with the use of the washing-machines now in use in the very best improved cider-mills.

Having thus described my invention, what I claim as new, and desire to secure by Letters Patent, is—

1. In a cider and fruit press, an endless belt provided with a corded edge adapted to carry the fruit layers from a grater to and under the press; a layer-chute extending from the grater to or near to the press; a cover-cloth adapted removably to the chute and extending down on the sides to the endless belt passing under the press provided with means to keep it extended; longitudinal spaces through the platen of the press and a short distance above its surface and slots from said spaces to and through said surface adapted to permit the corded edges of the endless belt to pass through and to hold them up in place; and means to operate the grater, the press and the endless belt.

2. In a cider and fruit press, an endless belt provided with a corded edge adapted to carry the fruit layers from a grater to or near to the press; a cover-cloth adapted removably to the chute and extending down on the sides to the endless belt passing under the press, provided with means to keep it extended; longitudinal spaces through the platen of the press and a short distance above its surface and slots from said spaces to and through said surface adapted to permit the corded edges of the endless belt to pass through and to hold them in place; and means to operate the grater, the press and the endless belt; and stopping-plates arranged to both ends of the press, the forward one provided with arms and hooks for the engagement of side projections on the platen, the plates being supported by supporting-rods attached to beam-springs pivoted on the upper part of the frame and so adjusted that when the platen is moved down a short distance, both plates are brought into impingement with it inclosing the fruit layer longitudinally and are held in impingement upon the further downward pressure by the spring of the beams.

In testimony whereof I affix my signature in presence of two witnesses.

HENRY BENDER.

Witnesses:
R. E. THAIN,
H. A. HARTMAN.